United States Patent
Yu et al.

(10) Patent No.: US 12,181,727 B2
(45) Date of Patent: Dec. 31, 2024

(54) LENS ASSEMBLY AND MOBILE TERMINAL

(71) Applicant: AUTEL ROBOTICS CO., LTD., Guangdong (CN)

(72) Inventors: Chun Yu, Guangdong (CN); Wenchao Zhang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 1153 days.

(21) Appl. No.: 16/938,181

(22) Filed: Jul. 24, 2020

(65) Prior Publication Data

US 2020/0355886 A1 Nov. 12, 2020

Related U.S. Application Data

(63) Continuation of application No. PCT/CN2018/113589, filed on Nov. 2, 2018.

(30) Foreign Application Priority Data

Jan. 24, 2018 (CN) .......................... 201820120515.9

(51) Int. Cl.
*G02B 7/02* (2021.01)
*B64C 39/02* (2023.01)
(Continued)

(52) U.S. Cl.
CPC ................ *G02B 7/02* (2013.01); *B64U 10/14* (2023.01); *B64U 60/50* (2023.01); *B64U 2101/30* (2023.01)

(58) Field of Classification Search
CPC ........ G02B 7/02; G02B 7/025; B64C 39/024; B64D 47/08; B64U 10/13; B64U 2101/30; H04N 23/00
(Continued)

(56) References Cited

U.S. PATENT DOCUMENTS 4,558,927 A * 12/1985 Omori ...................... G02B 7/10
359/695
5,231,435 A * 7/1993 Blakely ................ G03B 15/006
396/419
(Continued)

FOREIGN PATENT DOCUMENTS

CN 201233464 Y 5/2009
CN 104267564 A 1/2015
(Continued)

OTHER PUBLICATIONS

The International Search Report mailed Jan. 24, 2019; PCT/CN2018/113589.

*Primary Examiner* — Stephone B Allen
*Assistant Examiner* — Daniel Jeffery Jordan
(74) *Attorney, Agent, or Firm* — Frank Gao, Esq.

(57) ABSTRACT

The present invention provides a lens assembly and a mobile terminal. The lens assembly includes a lens and a protective casing. The lens and the protective casing are fixedly connected to the mobile terminal separately. The lens is sheathed in the protective casing. A spacing exists between the protective casing and the lens. In the lens assembly and the mobile terminal provided in this embodiment, when the lens assembly is impacted, the protective casing receives the impact first and is deformed. Without direct connection or contact between the lens and the protective casing, a force received by the protective casing will not be directly transmitted to the lens, and the lens will not be pressed to deform by the protective casing, thereby avoiding a circumstance in which the deformation of the lens makes the mobile terminal unable to accurately recognize an obstacle.

16 Claims, 2 Drawing Sheets

(51) Int. Cl.
*B64D 47/08* (2006.01)
*B64U 10/13* (2023.01)
*B64U 101/30* (2023.01)
*B64U 10/14* (2023.01)
*B64U 60/50* (2023.01)

(58) Field of Classification Search
USPC .......................... 359/694–706, 808, 811–830
See application file for complete search history.

(56) References Cited

U.S. PATENT DOCUMENTS

| | | | | |
|---|---|---|---|---|
| 6,707,619 | B1* | 3/2004 | Okuno | G08B 13/19632 |
| | | | | 359/694 |
| 7,963,707 | B2* | 6/2011 | Jung | G03B 17/08 |
| | | | | 396/427 |
| 8,553,142 | B2* | 10/2013 | Lan | H01L 27/14625 |
| | | | | 348/374 |
| 9,140,890 | B1* | 9/2015 | Wilhelm | G02B 7/023 |
| 9,464,938 | B2* | 10/2016 | Tillotson | B64U 20/87 |
| 2008/0068727 | A1* | 3/2008 | Widdowson | G02B 7/102 |
| | | | | 359/694 |
| 2009/0097138 | A1* | 4/2009 | Yumiki | G03B 17/14 |
| | | | | 359/809 |
| 2012/0262708 | A1* | 10/2012 | Connolly | G01M 5/0091 |
| | | | | 701/2 |

FOREIGN PATENT DOCUMENTS

| | | | |
|---|---|---|---|
| CN | 107458616 | A | 12/2017 |
| CN | 207926714 | U | 9/2018 |
| JP | 2008102354 | A | 5/2008 |

* cited by examiner

LENS ASSEMBLY AND MOBILE TERMINAL

CROSS-REFERENCE TO RELATED APPLICATIONS

This application is a continuation application of International Application No. PCT/CN2018/113589, filed on Nov. 2, 2018, which claims priority of Chinese Patent Application No. 201820120515.9, filed on Jan. 24, 2018, which is incorporated herein by reference in its entirely.

BACKGROUND

Technical Field

The present invention relates to the technical field of an unmanned aerial vehicle, and in particular, to a lens assembly and a mobile terminal.

Related Art

An unmanned aerial vehicle is an unmanned aircraft. Compared with a traditional aircraft, the unmanned aerial vehicle is smaller in size and easier to take off and land, and has a smaller turning radius. The unmanned aerial vehicle can perform special tasks such as forward flight, reverse flight, hovering and vertical flight when flying in the air, and therefore, can be widely applied in various fields. In addition, the unmanned aerial vehicle is generally equipped with a lens to improve its capabilities of recognizing an obstacle. Performance of the lens directly affects the capabilities of the unmanned aerial vehicle in recognizing obstacles.

In the prior art, to protect the lens from collision, the unmanned aerial vehicle is generally equipped with a lens assembly. The lens assembly includes a protective casing and a lens. The protective casing is fixed to a fuselage of the unmanned aerial vehicle, and the lens is fixed to the protective casing and connected to the protective casing. When the unmanned aerial vehicle undergoes a collision during flight, the collision is effected on the protective casing on the lens assembly first, thereby protecting the internal lens from being scratched or damaged.

However, when the unmanned aerial vehicle receives a too large collision force, the protective casing deforms under impact, thereby squeezing the lens and deforming the lens. If the lens is a lens providing an obstacle avoidance function on the unmanned aerial vehicle, the deformation makes the unmanned aerial vehicle unable to accurately recognize a position of an obstacle.

SUMMARY

The present invention provides a lens assembly and a mobile terminal to solve a problem that a lens assembly cannot accurately recognize an obstacle after a mobile terminal is impacted in the prior art.

To solve the foregoing technical problem, the present invention provides a lens assembly mounted on a mobile terminal. The lens assembly includes a lens and a protective casing configured to protect the lens.

The lens and the protective casing are connected to the mobile terminal separately, the protective casing covers the lens, and a spacing exists between the protective casing and the lens.

In an embodiment of the present invention, the lens assembly further includes a lens bracket mounted on the mobile terminal, and the lens is mounted on the lens bracket.

In an embodiment of the present invention, a second mounting part configured to connect to the mobile terminal is disposed on the lens bracket, and the second mounting part is a connection hole or a buckle.

In an embodiment of the present invention, the lens is glued to the lens bracket.

In an embodiment of the present invention, the lens assembly further includes a protective casing bracket connected to the mobile terminal, and the protective casing is mounted on the protective casing bracket.

In an embodiment of the present invention, a first mounting part configured to connect to the mobile terminal is further disposed on the protective casing bracket, and the first mounting part is a connection hole or a buckle.

In an embodiment of the present invention, the protective casing is screwed to the protective casing bracket.

In an embodiment of the present invention, the lens includes a first lens and a second lens, the first lens and the second lens being disposed at two ends of the lens bracket respectively; and the protective casing includes a first protective casing covering the first lens and a second protective casing covering the second lens, the first protective casing and the second protective casing being fixed to two ends of the lens bracket respectively.

In an embodiment of the present invention, the lens bracket is plate-shaped, and the protective casing bracket is a rectangular frame structure; and the lens bracket is sheathed in the protective casing bracket, and a spacing exists between the protective casing bracket and the lens bracket.

In an embodiment of the present invention, a mounting hole is disposed on the protective casing bracket, and the lens bracket is located in the mounting hole.

In an embodiment of the present invention, the protective casing is cylindrical, and a length of the protective casing along an axial direction of the protective casing is greater than a length of the lens along the same axial direction.

To solve the foregoing technical problem, the present invention further provides a mobile terminal, including a mobile terminal body and the lens assembly described above. The lens assembly is mounted on the mobile terminal body.

In an embodiment of the present invention, the mobile terminal is an unmanned aerial vehicle.

In the lens assembly and the mobile terminal provided in the present invention, the lens and the protective casing are fixed to the mobile terminal body separately, and a spacing exists between the protective casing and the lens. When the lens assembly is impacted, the protective casing receives the impact first and is deformed. Without direct connection or contact between the lens and the protective casing, a force received by the protective casing will not be directly transmitted to the lens, and the lens will not be pressed to deform by the protective casing, thereby avoiding a circumstance in which the deformation of the lens makes the mobile terminal unable to accurately recognize the obstacle.

BRIEF DESCRIPTION OF THE DRAWINGS

Specific implementations of the present invention are described below in detail with reference to the accompanying drawings. It should be understood that the specific implementations described herein are merely used for describing and explaining the present invention, and the present invention is not limited to the following specific implementations.

REFERENCE NUMERALS

Figure 1:
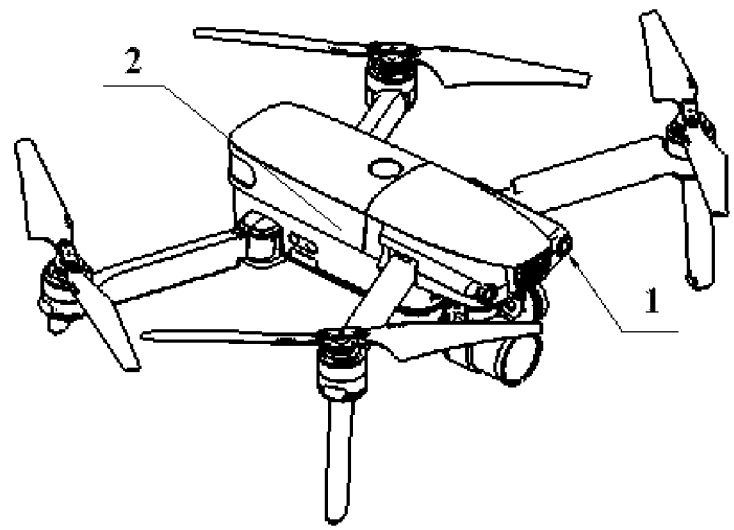
FIG. 1 is an overall schematic structural diagram of an unmanned aerial vehicle according to the present invention.

1: Lens assembly;
11: Lens;
111: First lens;
112: Second lens;
12: Protective casing;
121: First protective casing;
122: Second protective casing;
13: Protective casing bracket;
131: Mounting hole;
132: Reinforcing rib;
14: Lens bracket;
2: Fuselage of an unmanned aerial vehicle; and
21: Mounting plate.

DETAILED DESCRIPTION

The following clearly and completely describes the technical solutions in the embodiments of the present application with reference to the accompanying drawings in the embodiments of the present application. Apparently, the described embodiments are merely some embodiments of the present application rather than all of the embodiments. All other embodiments obtained by a person of ordinary skill in the art based on the embodiments of the present application without creative efforts shall fall within the protection scope of the present application.

It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. Orientation or position relationships indicated by terms "upper", "lower", "inside", "outside", "top", "bottom", and the like used in this specification are orientation or position relationships shown based on the accompanying drawings, and are used only for ease and brevity of illustration and description, rather than indicating or implying that the mentioned apparatus or component must have a specific orientation or mush be constructed and operated in a specific orientation. Therefore, such terms should not be construed as a limitation to the present application. In addition, terms "first", "second", and "third" are only used to describe the objective and cannot be understood as indicating or implying relative importance.

Unless otherwise defined, meanings of all technical and scientific terms used in this specification are the same as that usually understood by a person skilled in the technical field to which the present application belongs. Terms used in the specification of the present application are merely intended to describe objectives of the specific embodiment, and are not intended to limit the present application. A term "and/or" used in this specification includes any or all combinations of one or more related listed items.

In addition, technical features involved in different embodiments of the present application described below may be combined together if there is no conflict.

The following describes the specific implementations of the present invention in detail with reference to the accompanying drawings. It should be understood that the specific implementations described herein are merely used for describing and explaining the present invention, and the present invention is not limited to the following specific implementations.

A lens assembly according to the embodiments of the present invention is applicable to various mobile terminals driven by a motor. Specifically, the mobile terminals may have a specific structure that is commonly seen in the prior art and that enables running on the ground or flying in the air, and may include, but is not limited to, an unmanned aerial vehicle (UAV), a ship, and a robot. Preferably, a mobile terminal may be an unmanned aerial vehicle. The unmanned aerial vehicle may be equipped with structures such as wings, a battery assembly, a communications module, and a landing gear, which are not specifically limited herein. Specifically, the present invention is described by using an unmanned aerial vehicle as an example, and description of other mobile terminals is omitted.

Figure 2:
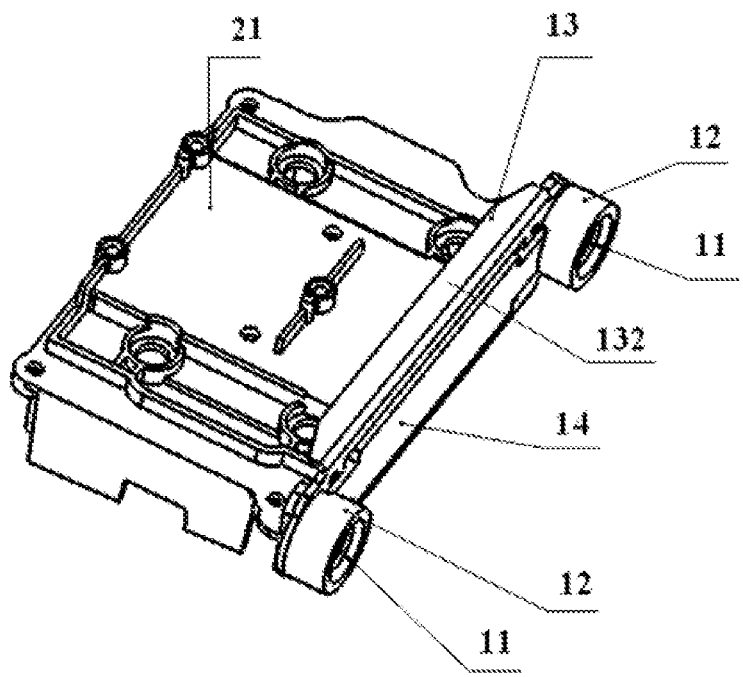
FIG. 2 is a mounting structural diagram of a fuselage and a lens assembly of the unmanned aerial vehicle shown in FIG. 1.
Figure 3:
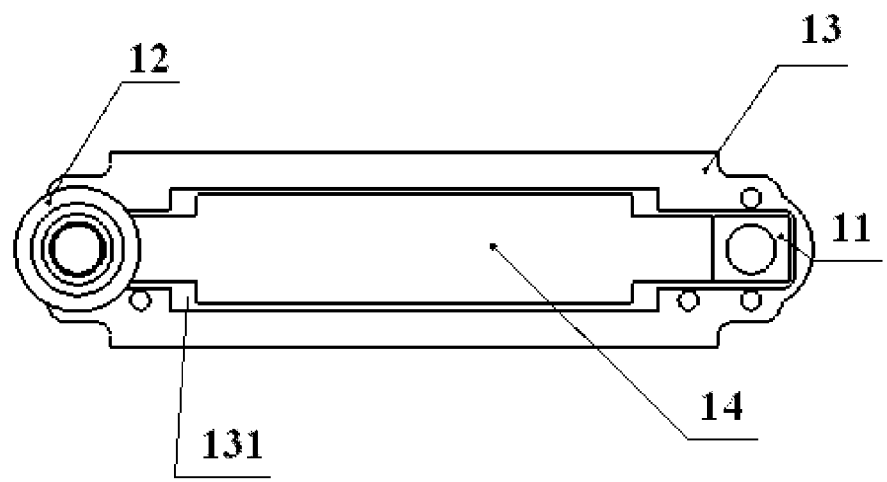
FIG. 3 is a schematic structural diagram of the lens assembly shown in FIG. 2.
Figure 4:
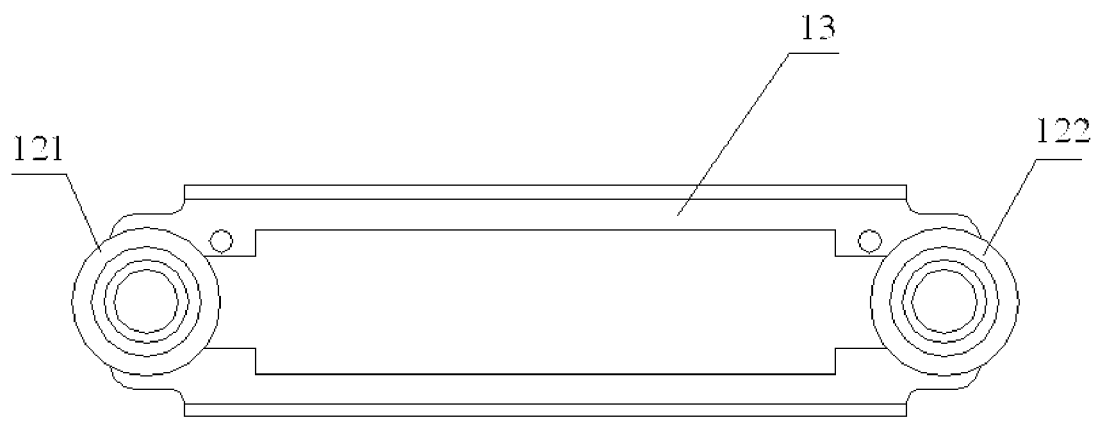
FIG. 4 is a schematic structural diagram of a protective casing and a protective casing bracket shown in FIG. 2.
Figure 5:
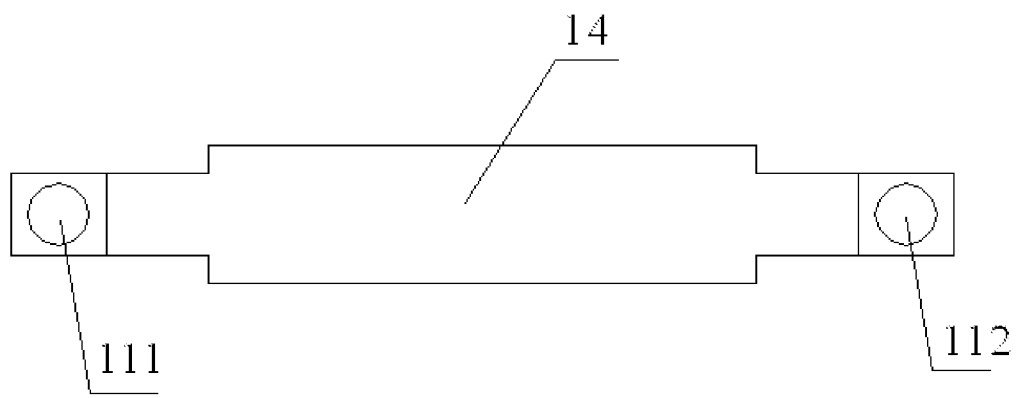
FIG. 5 is a schematic structural diagram of a lens and a lens bracket shown in FIG. 2.

FIG. 1 is an overall schematic structural diagram of an unmanned aerial vehicle according to the present invention. FIG. 2 is a mounting structural diagram of a fuselage and a lens assembly of the unmanned aerial vehicle shown in FIG. 1. FIG. 3 is a schematic structural diagram of the lens assembly shown in FIG. 2. FIG. 4 is a schematic structural diagram of a protective casing and a protective casing bracket shown in FIG. 2. FIG. 5 is a schematic structural diagram of a lens and a lens bracket shown in FIG. 2.

As shown in FIG. 1, this embodiment provides an unmanned aerial vehicle, including a fuselage 2, an arm 3 connected to the fuselage 2, a power unit 4 disposed on the arm 3, and a lens assembly 1 mounted on the fuselage 2. The arm 3 may be fixedly connected to the fuselage 3, and may be folded or unfolded relative to the fuselage 3. The power unit 4 generally includes: a motor mounted at an end of the arm 3, the end being away from the fuselage 2; and a propeller connected to a motor shaft of the motor. Rotation of the motor shaft drives the propeller to rotate at high speed to generate flight power of the unmanned aerial vehicle.

The lens assembly 1 includes a lens 11 and a protective casing 12. The lens 11 and the protective casing 12 are fixedly connected to the fuselage 2 separately. The lens 11 is sheathed in the protective casing 12. A spacing exists between the protective casing 12 and the lens 11.

The lens assembly 1 may be fixed to the fuselage of the unmanned aerial vehicle. Preferably, the lens assembly 1 may be fixed to a mounting plate 21 inside the fuselage 2. The mounting plate 21 may be a plate-like structure extending in a horizontal direction, and a plurality of reinforcing structures may be formed on the mounting plate 21. The lens assembly 1 may be fixed to the mounting plate 21, and specifically, may be fixed and connected in such manners as screwing and clamping, as is not specifically limited herein. A mounting part configured to fixedly connect to the fuselage 2 is further disposed on the mounting plate 21, whereby the lens assembly 1 is mounted on the mounting plate 21. The mounting part may be a buckle, a screw hole, a connection hole or the like.

The lens 11 may be a device used for photographing in the prior art, for example, a normal lens, a wide-angle lens, a telephoto lens, or any other type of lens. The lens 11 may shoot or recognize a position of an obstacle, which is not specifically limited herein.

The position to which the lens 11 is fixed on the fuselage 2 may differ. For example, the lens 11 may be fixed to a top of the fuselage 2, or may be connected to a bottom of the fuselage 2. The specific position may be set according to actual conditions.

In addition, the lens 11 may be fixed and connected to the fuselage 2 in various manners such as clamping and screwing. Preferably, the lens 11 may be glued to the fuselage 2 through an adhesive to simplify the connection structure and quicken the mounting.

Serving as a main part for protecting the lens 11, the protective casing 12 may have diverse structures, for example, a fixed-cross-section structure that does not change in a cross section thereof, or a variable-cross-section structure that changes in the size and shape of the cross section. The specific structure is not limited herein. Preferably, the protective casing 12 may be spherical, and may cover the inside lens 11. In addition, a through hole may be opened at a position that is on the protective casing 12 and that directly faces the lens 11, so as not to prevent the lens 11 from photographing an external environment.

The material of the protective casing 12 may also be diverse. For example, the protective casing 12 may be manufactured with a material available in the prior art and processed in a common method, for example, processed by molding or forging a metal material (an iron material, a copper material, or the like), or through injection molding of plastic, as is not specifically limited herein.

The protective casing 12 may also be fixed to the fuselage 2, and may be fixed and connected in various manners such as gluing, clamping and riveting. Preferably, the protective casing 12 may be detachably connected to the fuselage 2 by screws. Therefore, the protective casing 12 is conveniently replaceable in case of being damaged by a collision with an obstacle, thereby reducing repair costs.

In addition, a spacing is required between the protective casing 12 and the lens 11 to ensure that no direct contact exists between the protective casing 12 and the lens 11. Therefore, even if the protective casing 12 is deformed, the lens 11 will not be deformed, and the lens 11 can still accurately recognize the position of the obstacle. The size of the spacing may be a fixed value. That is, the spacings between the protective casing 12 and the lens 11 are uniform. Alternatively, the size of the spacing may be a variable value. That is, the spacings between the protective casing 12 and different positions of the lens 11 may differ. The specific spacings may be set according to actual conditions. If space permits, a spacing between a fixed position of the protective casing 12 and a fixed position of the lens 11 is as large as possible, so as to reduce the impact caused by the deformation of the protective casing 12 onto the lens 11.

When the lens assembly 1 collides with an obstacle due to careless operation, the protective casing 12 undergoes the collision first and is deformed by impact. However, without direct contact between the protective casing 12 and the lens 11, the impact received by the protective casing 12 will not be directly transmitted to the lens 11 to cause deformation of the lens 11. Therefore, the lens 11 can still accurately recognize the position of the obstacle.

In the lens assembly provided in this embodiment, the lens and the protective casing that sheathes the lens are configured. The lens and the protective casing are fixed to the mobile terminal separately, and a spacing exists between the protective casing and the lens. When the lens assembly is impacted, the protective casing receives the impact first and is deformed. Without direct connection or contact between the lens and the protective casing, a force received by the protective casing will not be directly transmitted to the lens, and the lens will not be pressed to deform by the protective casing, thereby avoiding a circumstance in which the deformation of the lens makes the mobile terminal unable to accurately recognize the obstacle.

Further, in another embodiment, the lens assembly 1 further includes a protective casing bracket 13 connected to the mounting plate 21. The protective casing 12 is fixed to the protective casing bracket 13. A first mounting part configured to fixedly connect to the mounting plate 21 is disposed on the protective casing bracket 13.

In an embodiment of the present invention, the structure of the first mounting part may also be diverse. For example, the first mounting part may be a connection hole, and a screw may pass through the connection hole to fit a threaded hole on the mounting plate 21, thereby screwing the protective case bracket 13 onto the mounting plate 21. For another example, the first mounting part may be a buckle, and a slot that fits the buckle may be disposed on the mounting plate 21, so that the protective casing bracket 13 is clamped to the mounting plate 21. Further, there may be a plurality of first mounting parts, and the plurality of first mounting parts may be disposed on the protective casing bracket 13 at intervals to enhance the effect of fixing the protective casing bracket 13 to the mobile terminal body 2.

The protective casing bracket 13 may be manufactured with a material available in the prior art and processed in a common method, for example, processed by molding or forging a metal material (an iron material, a copper material, or the like), or through injection molding of plastic, as is not specifically limited herein. Preferably, the protective casing bracket 13 may be a lightweight metal material, thereby reducing weight of the mobile terminal and increasing firmness of connection.

In addition, a shape of the protective casing bracket 13 may be diverse. For example, the protective casing bracket 13 may be an extrusion profile or framework structure.

The protective casing 12 may be fixedly connected to the protective casing bracket 13 in different ways such as riveting and clamping. Preferably, the protective casing 12 may be screwed onto the protective casing bracket 13, thereby simplifying the structure and being easy to implement. Understandably, the method of fixing and connection between the protective casing 12 and the protective casing bracket 13 may be the same as or different from the method of fixing and connection between the protective casing bracket 13 and the mounting plate 21, as is not specifically limited herein.

Preferably, the protective casing bracket 13 may be not in contact with the lens 11. Therefore, the impact received by the protective casing 12 is prevented from being transmitted to the lens 11 through the protective casing bracket 13 to affect the recognition of the obstacle by the lens 11. Moreover, the impact received by the protective casing 12 passes through the protective casing bracket 13 before being transmitted to the fuselage 2. Therefore, the impact received by the fuselage 2 is reduced, and the impact on the lens 11 is further reduced.

In another embodiment, the lens assembly 1 further includes a lens bracket 14 connected to the mounting plate 21. The lens 11 is fixed to the lens bracket 14. A second mounting part configured to fixedly connect to the mounting plate 21 is disposed on the lens bracket 14. The structure of the second mounting part may also be diverse. For example, the second mounting part may be a connection hole, and a screw may pass through the connection hole to fit a threaded hole on the mounting plate 21, thereby screwing the lens bracket 14 onto the mounting plate 21. For another example, the second mounting part may be a buckle, and a slot that fits the buckle may be disposed on the mounting plate 21, so that the lens bracket 14 is clamped to the mounting plate 21.

Further, there may be a plurality of second mounting parts, and the plurality of second mounting parts may be disposed on the lens bracket 14 at intervals to enhance the effect of fixing the lens bracket 14 to the mounting plate 21.

In an embodiment of the present invention, the lens bracket 14 may be manufactured with a material available in the prior art and processed in a common method, for example, processed by molding or forging a metal material (an iron material, a copper material, or the like), or through injection molding of plastic, as is not specifically limited herein. Preferably, the lens bracket 14 may be a lightweight metal material, thereby reducing weight of the mobile terminal and increasing firmness of connection.

In addition, a shape of the lens bracket 14 may be diverse. For example, the lens bracket 14 may be an extrusion profile or framework structure.

The lens 11 may be fixed and connected to the lens bracket 14 in various manners such as screwing and clamping. Preferably, the lens 11 may be glued to the lens bracket 14 to facilitate and quicken mounting. Understandably, the method of fixing and connection between the lens 11 and the lens bracket 14 may be the same as or different from the method of fixing and connection between the lens bracket 14 and the mounting plate 21, as is not specifically limited herein.

In a practicable implementation, the lens assembly 1 may have one lens 11 and one protective casing 12. Further, the lens assembly 1 may also have one lens bracket 14 and one protective casing bracket 13. The lens 11 may be fixed to the mounting plate 21 through the lens bracket 14, and the protective casing 12 may be fixed to the mounting plate 21 through the protective casing bracket 13. In addition, a spacing exists between the lens 11 and the protective casing 12 to reduce the effect of the impact on the lens 11.

Furthermore, for a mobile terminal that is required to provide different functions, there may be a plurality of lenses 11, for example, two, three, or four lenses, as can be specifically set according to actual conditions. In addition, each lens 11 may be sheathed in a protective casing 12 so that each lens 11 is protected. There may also be one or more lens brackets 14 and one or more protective casing brackets 13. For example, the number of lens brackets 14 may be the same as the number of lenses 11. That is, each lens 11 may be fixed to the mobile terminal body 2 through a separate lens bracket 14. For another example, the number of the lens bracket 14 is 1, and a plurality of lenses 11 are all fixed to the lens bracket 14 at intervals. Understandably, the number of protective casing brackets 13 may be the same as the number of protective casings 12. That is, each protective casing 12 may be fixed to the mounting plate 21 through a separate protective casing bracket 13. The number of protective casing brackets 13 may also be one, and a plurality of protective casings 12 may be fixed to the protective casing bracket 13 at intervals.

Referring to FIG. 3 to FIG. 5, as a preferred embodiment, the lens 11 includes a first lens 111 and a second lens 112. The protective casing 12 includes a first protective casing 121 and a second protective casing 122. The first protective casing 121 sheathes the first lens 111, and the second protective casing 122 sheathes the second lens 112. The number of the lens bracket 14 is one, and the first lens 111 and the second lens 112 are fixed to two ends of the lens bracket 14 respectively. The number of the protective casing bracket 13 is one, and the first protective casing 121 and the second protective casing 122 are fixed to two ends of the protective casing bracket 13 respectively.

In an embodiment of the present invention, the lens bracket 14 takes on a plate shape extending along a first preset direction. The first lens 111 and the second lens 112 are fixed to two ends of the lens bracket 14 respectively along the first preset direction. The protective casing bracket 13 is also a rectangular framework shape extending along a second preset direction. The first protective casing 121 and the second protective casing 122 are fixed to two ends of the protective casing bracket 13 respectively along the second preset direction.

The first preset direction may be a linear direction or a curved direction, as is not specifically limited herein. Preferably, the first preset direction may be a horizontal direction, a vertical direction, or the like. Similarly, the second preset direction may be a linear direction or a curved direction, as is not specifically limited herein. Preferably, the second preset direction may be a horizontal direction, a vertical direction, or the like. In the embodiment of the present invention, the second preset direction may be the same as the first preset direction, thereby simplifying the structure of the protective casing bracket 13 and the lens bracket 14.

On the basis of the above embodiment, the protective casing bracket 13 sheathes the lens bracket 14, and a spacing exists between the protective casing bracket 13 and the lens bracket 14.

For example, the protective casing bracket 13 may be an arc-shaped structure, and may define an accommodation cavity with an opening opened on one side. The lens bracket 14 may be located in the accommodation cavity. An edge of the lens bracket 14 is not in contact with the protective casing bracket 13, thereby forming a spacing between the protective casing bracket 13 and the lens bracket 14. That is, the protective casing bracket 13 and the lens bracket 14 are not in contact with each other, so that the deformed protective casing 12 will not press the lens 11. Moreover, the impact received by the protective casing 12 passes through the protective casing bracket 13 before being transmitted to the mobile terminal body 2, and then passes through the lens bracket 14 before being transmitted to the lens 11. Therefore, the lens 11 is hardly affected by the impact, and recognition results are more accurate.

In addition, the size of the spacing may be a fixed value. That is, the spacings between the protective casing bracket 13 and the lens bracket 14 may be uniform. Alternatively, the size of the spacing may be a variable value. That is, the spacings between the protective casing bracket 13 and different positions of the lens bracket 14 may differ. The specific spacings may be set according to actual conditions. If space permits, the spacing between the protective casing bracket 13 and the lens bracket 14 is as large as possible, so as to reduce the impact transmitted between the protective casing bracket 13 and the lens bracket 14.

In an embodiment of the present invention, a mounting hole 131 is disposed on the protective casing bracket 13, and the lens bracket 14 is accommodated in the mounting hole 131. That is, the protective casing bracket 13 may be a hollow annular structure or a rectangular framework structure. The lens bracket 14 may be located inside the protective casing bracket 13, thereby reducing the required mounting space and enhancing the strength of the protective casing bracket 13.

On the basis of the above embodiment, the first lens 111 and the second lens 112 are symmetrically arranged with respect to the same plane, and the first protective casing 121 and the second protective casing 122 are symmetrically arranged with respect to the same plane, so as to enhance structural stability. The plane may be a horizontal plane or a vertical plane in the case of horizontal arrangement, as is not specifically limited herein. Further, the lens bracket 14 may be symmetric with respect to such plane, and the protective casing bracket 13 may also be symmetric with respect to such plane, to support the strength.

In addition, in order to enhance the strength of the protective casing bracket 13, the protective casing bracket 13 may be equipped with a reinforcing rib 132. The reinforcing rib 132 may be formed by sheet metal bending or stamping. Preferably, the reinforcing rib 132 may be formed by bending the edge of the protective casing bracket 13 to enhance the strength of the protective casing bracket 13.

On the basis of the above embodiment, as a preferred implementation of the protective casing 12, the protective casing 12 is cylindrical, and the length of the protective casing 12 along an axial direction is greater than the length of the lens 11 along the same axial direction. Therefore, the protective casing 12 can protrude from a surface of the lens 11 to accomplish a better protection effect.

When an unmanned aerial vehicle accidentally collides with an obstacle during flight, the protective casing 12 in the lens assembly 1 can protect the lens 11 from being damaged. In addition, as the protective casing 12 and the lens 11 are both mounted on the fuselage 2 and spaced apart from each other by a spacing, the impact received by the protective casing 12 will not affect the lens 11. Therefore, the lens 11 will not be impacted or pressed to deform, and the obstacle detection function of the mobile terminal will not be affected.

The lens assembly provided in this embodiment includes a lens and a protective casing that sheathes the lens. The lens and the protective casing are fixed to the fuselage of the unmanned aerial vehicle separately, and a spacing exists between the protective casing and the lens. When the lens assembly is impacted, the protective casing receives the impact first and is deformed. Without direct connection or contact between the lens and the protective casing, a force received by the protective casing will not be directly transmitted to the lens, and the lens will not be pressed to deform by the protective casing, thereby avoiding a circumstance in which the deformation of the lens makes the mobile terminal unable to accurately recognize the obstacle.

Finally, it should be noted that the foregoing embodiments are merely used for describing the technical solutions of the present invention, but are not intended to limit the present invention. Although the present invention is described in detail with reference to the foregoing embodiments, it should be appreciated by a person skilled in the art that, modifications may still be made to the technical solutions described in the foregoing embodiments, or equivalent replacements may be made to the part of all of the technical features; and these modifications or replacements will not cause the essence of corresponding technical solutions to depart from the scope of the technical solutions in the embodiments of the present invention.

What is claimed is:

1. A lens assembly mounted on a mobile terminal, wherein: the lens assembly comprises a lens and a protective casing configured to protect the lens; and
   the lens and the protective casing are connected to the mobile terminal separately, the protective casing covers the lens, and a spacing exists between the protective casing and the lens;
   wherein the lens assembly further comprises a lens bracket mounted on the mobile terminal, and the lens is mounted on the lens bracket, and the lens is mounted on the lens bracket without contact;
   wherein the lens assembly further comprises a protective casing bracket connected to the mobile terminal, and the protective casing is mounted on the protective casing bracket;
   wherein the lens comprises a first lens and a second lens, the first lens and the second lens being disposed at two ends of the lens bracket respectively; and
   the protective casing comprises a first protective casing covering the first lens and a second protective casing covering the second lens, the first protective casing and the second protective casing being fixed to two ends of the lens bracket respectively.

2. The lens assembly according to claim 1, wherein a second mounting part configured to connect to the mobile terminal is disposed on the lens bracket, and the second mounting part is a connection hole or a buckle.

3. The lens assembly according to claim 1, wherein the lens is glued to the lens bracket.

4. The lens assembly according to claim 1, wherein a first mounting part configured to connect to the mobile terminal is further disposed on the protective casing bracket, and the first mounting part is a connection hole or a buckle.

5. The lens assembly according to claim 1, wherein the protective casing is screwed to the protective casing bracket.

6. The lens assembly according to claim 1, wherein: the lens bracket is plate-shaped, and the protective casing bracket is a rectangular frame structure; and the lens bracket is sheathed in the protective casing bracket, and a spacing exists between the protective casing bracket and the lens bracket.

7. The lens assembly according to claim 1, wherein a mounting hole is disposed on the protective casing bracket, and the lens bracket is located in the mounting hole.

8. The lens assembly according to claim 1, wherein the protective casing is cylindrical, and a length of the protective casing along an axial direction of the protective casing is greater than a length of the lens along the same axial direction.

9. A mobile terminal, comprising a mobile terminal body and a lens assembly, the lens assembly being mounted on the mobile terminal body, wherein the lens assembly is mounted on the mobile terminal, wherein: the lens assembly comprises a lens and a protective casing configured to protect the lens; and
   the lens and the protective casing are connected to the mobile terminal separately, the protective casing covers the lens, and a spacing exists between the protective casing and the lens;
   wherein the lens assembly further comprises a lens bracket mounted on the mobile terminal, and the lens is mounted on the lens bracket, and the lens is mounted on the lens bracket without contact;

wherein the lens assembly further comprises a protective casing bracket connected to the mobile terminal, and the protective casing is mounted on the protective casing bracket;

wherein the lens comprises a first lens and a second lens, the first lens and the second lens being disposed at two ends of the lens bracket respectively; and the protective casing comprises a first protective casing covering the first lens and a second protective casing covering the second lens, the first protective casing and the second protective casing being fixed to two ends of the lens bracket respectively.

10. The mobile terminal according to claim 9, wherein the mobile terminal is an unmanned aerial vehicle.

11. The lens assembly according to claim 9, wherein a size of the spacing is a fixed value.

12. The lens assembly according to claim 9, wherein a size of the spacing is a variable value.

13. The mobile terminal according to claim 9, wherein the lens assembly is fixed to a mounting plate inside a fuselage of the mobile terminal.

14. The mobile terminal according to claim 13, wherein the lens assembly is fixed to the mounting plate in a screwing manner or a clamping manner.

15. The mobile terminal according to claim 9, wherein the protective casing is fixed to a fuselage of the mobile terminal.

16. The mobile terminal according to claim 9, wherein the protective casing is detachably connected to the fuselage by a screw.

* * * * *